Dec. 3, 1935.  L. I. DANA ET AL  2,023,006

WET DRUM METER

Filed Feb. 10, 1933   2 Sheets-Sheet 2

INVENTOR
LEO I. DANA
FRANK P. KINSON
BY
ATTORNEY

Patented Dec. 3, 1935

2,023,006

UNITED STATES PATENT OFFICE 2,023,006

WET DRUM METER

Leo I. Dana and Frank P. Kinson, Buffalo, N. Y., assignors to The Linde Air Products Company, a corporation of Ohio Application February 10, 1933, Serial No. 656,134

12 Claims. (Cl. 73—1)

The invention pertains to indicators such as meters of the rotary wet drum type for measuring the volume of moving gases, and more specifically to means for adapting such meters to oxygen or oxidizing gases under abnormally high pressure, and to means for increasing the accuracy, range, and service life of such meters.

Meters of this type are not commercially available for gas pressures greater than a few inches of water above the pressure of the atmosphere, hence for higher gas pressures less accurate meters of a different type must be used which are unsatisfactory when used with comparatively expensive gases especially those of an oxidizing nature such as oxygen. Therefore, one object is to provide such a meter with means to adapt it to oxidizing gases such as oxygen under pressures up to 200 pounds to the square inch.

In meters of this type the surface of the water within the drum is depressed below that in the meter outside the drum, and the amount of depression is a direct function of the mechanical friction of the meter which ordinarily increases with use. Such meters are equipped with means for indicating the water level outside the drum, but this is unsatisfactory as the accuracy of the meter depends upon the water level within the drum and this level varies with respect to that outside the drum as the mechanical friction varies, and consequently such means does not indicate the accuracy or running condition of the meter. Therefore, another object is to provide such a meter with means for indicating the water level in the drum and thus the accuracy of the meter and also its running condition or relative friction which is indicated by a change in water level.

Another object is to increase the accuracy and service of such a meter, and to this end I provide an improved gear train between the drum and the gas indicator or register that materially reduces the resistance to drum rotation, and also means for changing the height of the surface of the water in the drum to the proper running level while the meter is in operation.

These and any other objects and novel features will appear in the following specification and the accompanying illustrations in which.

Figure 1:
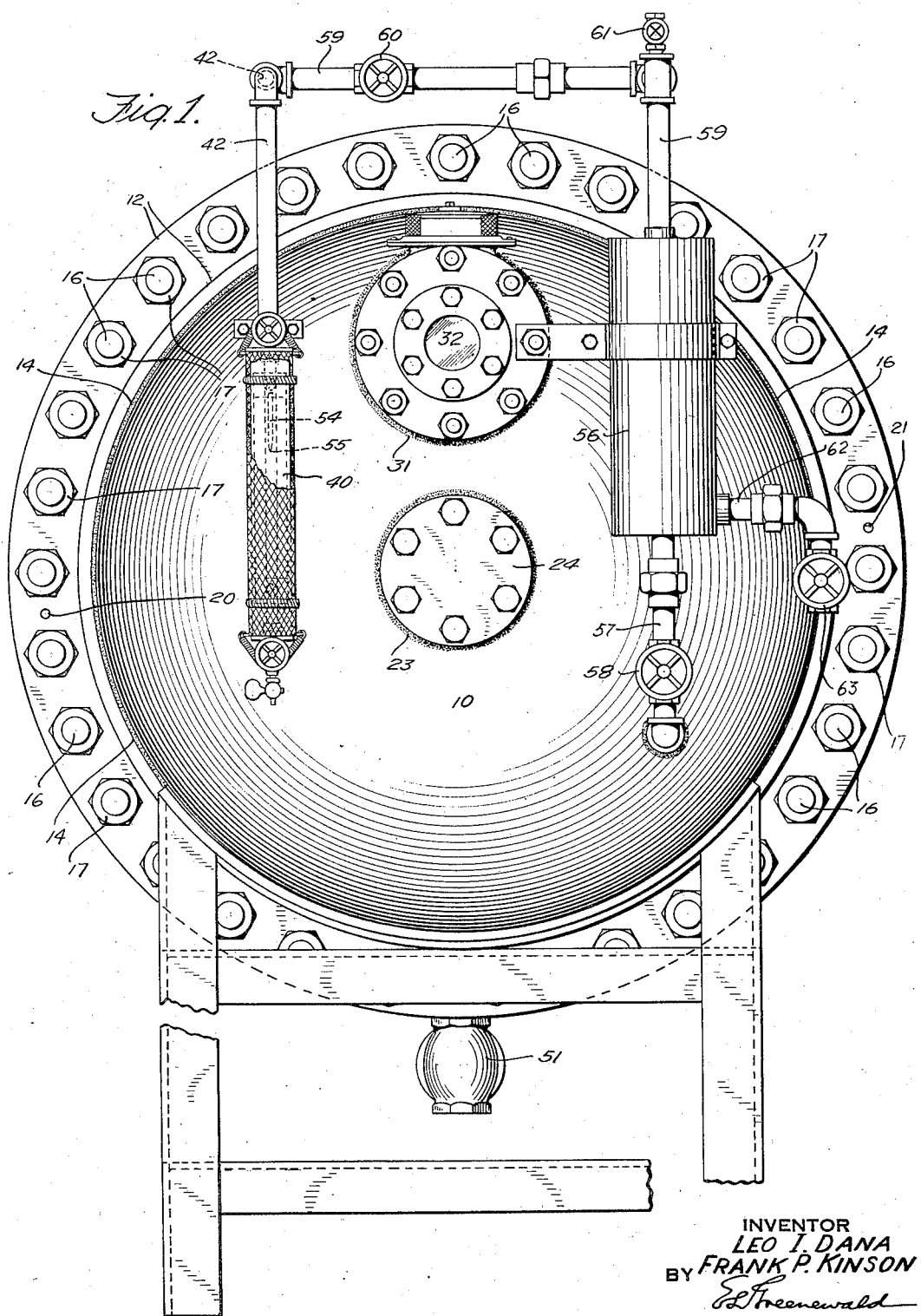
Fig. 1 is a reduced end view of a meter in which one embodiment of our invention is incorporated.
Figure 2:
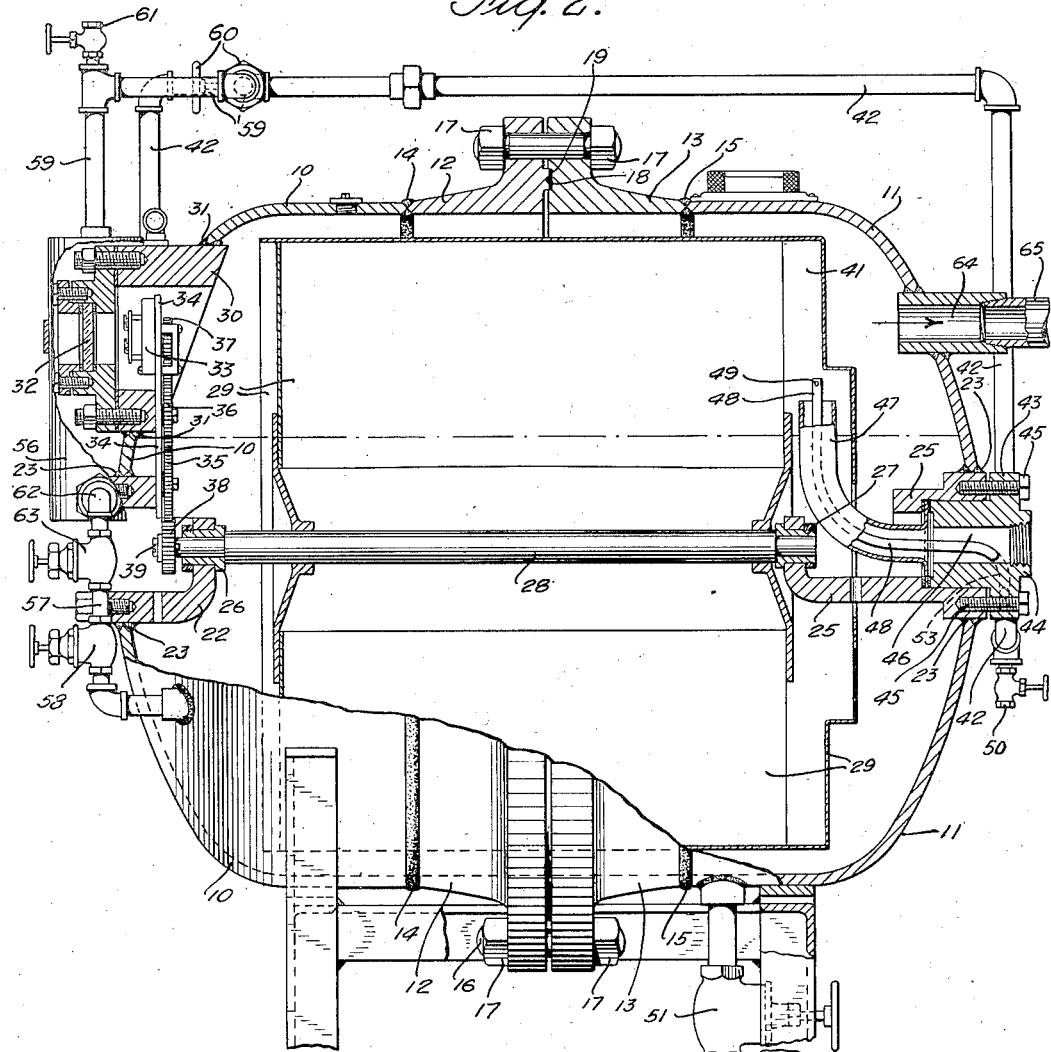
Fig. 2 is a side view of the meter shown in Fig. 1 with the upper portion of the casing broken away to show the interior structure in vertical section.
Figure 3:
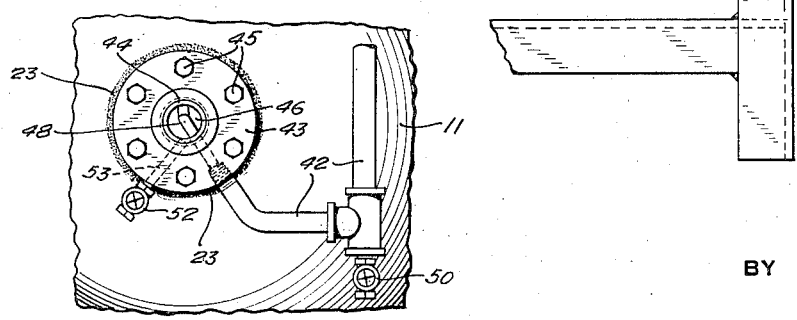
Fig. 3 is a detail view showing part of the pressure line between the top of the water gage and filling tank and the dry well of the meter drum.

According to the invention the means for adapting the meter to high internal gas pressure comprises a casing and accessory conduits adapted to withstand such pressure. For sake of economy and ease of manufacture the casing is formed of two semi-ellipsoidal heads or end sections 10 and 11, and two annular flanges or central sections 12 and 13, and both the heads and the flanges are identical in the rough.

Each head is permanently secured to one of the flanges by suitable means such as an annular autogenous weld, and the flanges are secured together by removable means such as studs or bolts. The flanges and heads are preferably of steel, and the annular edge of head 10 is secured to the annular outer edge of flange 12 by weld 14, and head 11 is secured to flange 13 in a similar manner by weld 15. The flanges 12 and 13 are secured together by studs 16 and cooperating nuts 17, and the meeting faces are provided with a tongue and groove joint 18 and a copper asbestos gasket 19 to seal the opening therebetween. The exact relative position of the flanges is insured by dowel pins 20 and 21.

The meter is provided with a combined hand hole and bracket 22 which is secured in an opening at the center of head 10 by an annular autogenous weld 23, and the outer end of the hand hole is closed by a removable cover 24. The meter is also provided with a combined stuffing box and bracket 25 that is secured in a similar manner at the center of head 11. Brackets 22 and 25 are respectively provided with bearings 26 and 27 of oxidizing resistant material that carry a shaft 28 of corrosion resistant metal upon which a horizontal meter drum 29 of a type known in the art is mounted.

The casing is also provided with a sleeve 30 secured in an opening in head 10 above bracket 22 by an annular weld 31, and secured to the outer end of this sleeve by suitable means is a sight glass or window 32 through which a register 33 within the meter may be observed. The register 33 is carried by a mounting plate 34 that is secured to the inner ends of sleeve 30 and bracket 22 by suitable means such as screws. This mounting plate 34 also carries two intermediate gears 35 and 36 through which an operating gear 37 secured to the register is driven by a gear 38 mounted on drum shaft 28 and secured by a conventional key and a retaining screw 39.

In prior meters of this type the ratio between the register and the drum has been such that the register rotated at ten times the speed of the drum. In this meter such a ratio is unsatisfactory for the reason that the register offers sufficient resistance to the rotation of the drum to materially impair the accuracy of the meter and in some cases cause its removal from service after only three weeks of operation. Therefore, gears 37 and 38 are in a single plane and of such size that the register rotates at the speed of the drum, and this reduction in ratio from that of prior practice is an important factor to the successful operation of this meter.

In order to indicate the height of the liquid such as water within the drum the meter is provided with a gage glass 40 having the lower end connected with the inside of the casing below the water level and the upper end connected with the gas space in the dry well of the drum. This gage may be placed in any desirable location and connected in various ways, but for convenience it is located at one end of the meter outside of the casing.

The lower end of the gage 40 is directly connected with the inside of the casing in a conventional manner by a pipe or fitting that is not shown, and the upper end is connected with the dry well 41 of drum 29 by a pipe 42 that extends from the gage upward and across the top of the meter, and then down adjacent the other end below the center of the meter and back up where it is secured in the under side of flange 43 of gland 44 which is secured in stuffing box 25 by studs 45.

Gland 44 is provided with an axial inlet opening 46 in communication with the opening in dry well horn 47 which is carried by the inner end of the gland and extends inward and upward in an arc into the gas space in dry well 41. The end of pipe 42 is connected with the dry well by a copper tube 48 secured at the surface of inlet opening 46 in a radial hole in flange 43, the outer end of this hole communicating with pipe 42.

In order to prevent the aspirating effect of the gas flowing into the meter through the dry well horn, from causing the gage to indicate a false water level, the inner end of tube 48 is closed with solder or other suitable means and the side of the tube near the end is provided with a suitable number such as four openings 49. In order to remove any accumulation of water from pipe 42 it is provided with a drain valve 50 at a low point therein. The meter casing is provided with a liquid removing device such as the drain valve 51, and inlet 46 is provided with a drain valve 52 secured in the outer end of a radial opening 53 in flange 43 of gland 44.

On prior meters a mark or line has been placed on a suitable surface outside and back of the gage glass to indicate the proper running level of the water in the meter casing, but due to the distance between the mark and the water in the gage glass, the height of the water cannot be adjusted with sufficient accuracy for a meter of this type. Therefore, I provide an indicator such as a metal rod 54 within the gage glass having a pointed end 55 exactly at the proper level for the water within the drum. The rod may be attached to the gage by any suitable means such as by securing the upper end in the cap over the gage glass opening in the upper gage fitting.

During normal operation of the meter some water is lost by moisture absorbed by the gas. This loss lowers the water level in the drum and impairs the accuracy of the meter. In order to raise the water level in such cases without interrupting the operation of the meter I provide a filling tank 56 having the lower end thereof connected with the interior of the casing below the water level by a pipe 57 having a drain valve 58 therein, and the upper end thereof connected with a common gas pressure pipe 42 by a pipe 59 having a pressure valve 60 for closing the line, and a vent valve 61 for relieving pressure therein. The lower end of tank 56 is also provided with a pipe 62, having a valve 63 therein, by which the tank may be connected with a source of water supply for filling.

In addition to the advantages mentioned, tank 56 also enables the water level within the drum to be adjusted while the meter is in operation thereby securing much greater accuracy than possible by making the adjustment with the meter stationary. This feature is of special importance due to the change in the depression of the water level in the drum resulting from the change in mechanical friction as the meter is used.

During operation oxygen or other gas under pressure enters inlet 46, through a suitable pipe not shown, and flows through gland 44, dry well horn 47, dry well 41, and drum 29, from which it escapes into the gas space above the water and flows from the meter through outlet 64 in the wall of head 11 above the surface of the water which is connected with a suitable outlet pipe or conduit 65. The flow of gas through the meter causes the drum 29 to rotate at a speed directly proportional to the volume of flowing gas, and the rotation of the drum drives a register 33 that indicates the volume of gas that has passed through the meter.

To fill tank 56 with water, valves 58 and 60 are first closed and vent valve 61 is opened, then by opening valve 63 water from a source of supply such as a city main will flow into tank 56. When it is full valves 61 and 63 are closed.

To add water to that in the meter, valve 60 is first opened to subject the water in tank 56 to the pressure in the meter and then valve 58 is opened until sufficient water has been added as indicated by gage 40.

Although the meter is especially adapted to an oxidizing gas, such as substantially pure oxygen, it may be used with other gases, and although it is adapted to such a gas at unusually high pressures up to 200 pounds to the square inch it may be used at lower pressures. Also the shape, form, and relative position of the component parts may be changed, and other equivalent or suitable materials may be substituted for those employed without departing from the range of the invention or the scope of the claims.

We claim:—

1. In a meter of the class described; a casing adapted to contain a liquid; a drum in said casing partially immersed in said liquid; a gage glass outside said casing having the lower end thereof below the surface of said liquid and the upper end thereof above the surface of said liquid; fluid conducting means connecting the lower end of said gage glass with the interior of said casing below the surface of said liquid; and fluid conducting means connecting the upper end of said gage glass with the interior of said drum above the surface of said liquid.

2. In a meter of the class described; a casing adapted to contain a liquid and a gas; a drum in said casing partially immersed in said liquid; a gage glass outside said casing; a fluid conductor connecting the lower end of said gage glass with the inside of said casing below the surface of said liquid outside said drum; and a fluid conductor connecting the upper end of said gage glass with the inside of said casing above the surface of said liquid inside said drum.

3. In a meter of the class described; a casing adapted to contain a liquid; a drum in said casing partially immersed in said liquid; and means outside said casing for indicating the height of said liquid in said drum during the operation of said meter, comprising a conduit having one end connected with the liquid in said casing and the other end connected with the gas in said drum and means in said conduit for rendering the height of the liquid therein visible.

4. In a meter of the class described; a casing adapted to contain a liquid; a drum in said casing partially immersed in said liquid; and means outside said casing for indicating the height of said liquid in said drum, comprising a conduit having one end connected with said liquid and the other end connected with the gas in the inlet end of said drum, and a transparent wall in said conduit.

5. In a meter of the class described; the combination of a casing adapted to contain liquid; a drum in said casing partially immersed in said liquid; and means outside said casing having communication with the gas space in said drum for indicating the height of said liquid in said drum during the operation of said meter.

6. In a meter of the class described; the combination of a casing adapted to contain liquid; a drum partially immersed in said liquid in which the height of said liquid varies from the correct operating level during operation; means for indicating the height of said liquid in said drum during operation of said meter; and means for also adding liquid to that in said casing during said operation to secure the correct operating level of said liquid in said drum.

7. In a meter of the class described; the combination of a casing adapted to contain liquid; a drum partially immersed in said liquid in which the height of said liquid varies from the correct operating level during operation; means for indicating the height of said liquid in said drum; and means for adding liquid to said casing during operation of said meter to secure the correct operating level of said liquid in said drum.

8. In a meter of the class described; the combination of a casing adapted to contain liquid; a drum partially immersed in said liquid in which variations in the height of said liquid lessen the accuracy of said meter; means for indicating the liquid level in said drum; means comprising a tank for adding liquid to said casing during operation of said meter to correct variations in the height of said liquid in said drum; and means for also filling said tank during said operation.

9. In a meter of the class described; a casing adapted to contain liquid; a drum partially immersed in said liquid in which the height of said liquid varies from the correct operating level during operation; means comprising a gage for indicating the water level in said drum during operation; means comprising a tank for adding liquid to said casing to overcome the variations in the liquid level in said drum; and common means for connecting said gage and said tank with the interior of said drum above said liquid.

10. In a meter of the class described; a casing adapted to contain a liquid; a drum partially immersed in said liquid in which the height of said liquid varies from the correct operating level during the operation of said meter; means for maintaining the correct operating level of said liquid within said drum, comprising a device for indicating the variations in the height of said liquid in said drum from the correct operating level, and means for varying the height of the liquid in said drum to secure the correct operating level.

11. In a meter of the class described; a casing adapted to contain a liquid; a drum partially immersed in said liquid in which the height of said liquid varies from the correct operating level during the operation of said meter; means operable to produce the correct operating level of said liquid within said drum comprising, a hydrostatic device for indicating the variations in the height of the liquid within the drum from the correct operating level, and a filling device for adding liquid to that in said casing against the operating pressure of said meter to change the height of the liquid in the drum to the correct operating level.

12. In a meter of the class described; a casing adapted to contain a liquid; a drum partially immersed in said liquid in which the height of said liquid varies from the correct operating level during the operation of said meter; means operable to bring the height of the liquid in said drum to the correct operating level comprising, a hydrostatic device suitably connected with said casing for indicating the liquid level within said drum, a liquid filling device for adding liquid to that in said casing to raise the height of the liquid in said drum to the correct operating level, and a liquid removing device for removing liquid from said casing to lower the height of the liquid in said drum to the correct operating level.

LEO I. DANA.
FRANK P. KINSON.